Apr. 10, 1923.
C. J. WESTERGAARD
MILK AND CREAM PASTEURIZER
Filed June 24, 1921
1,451,132
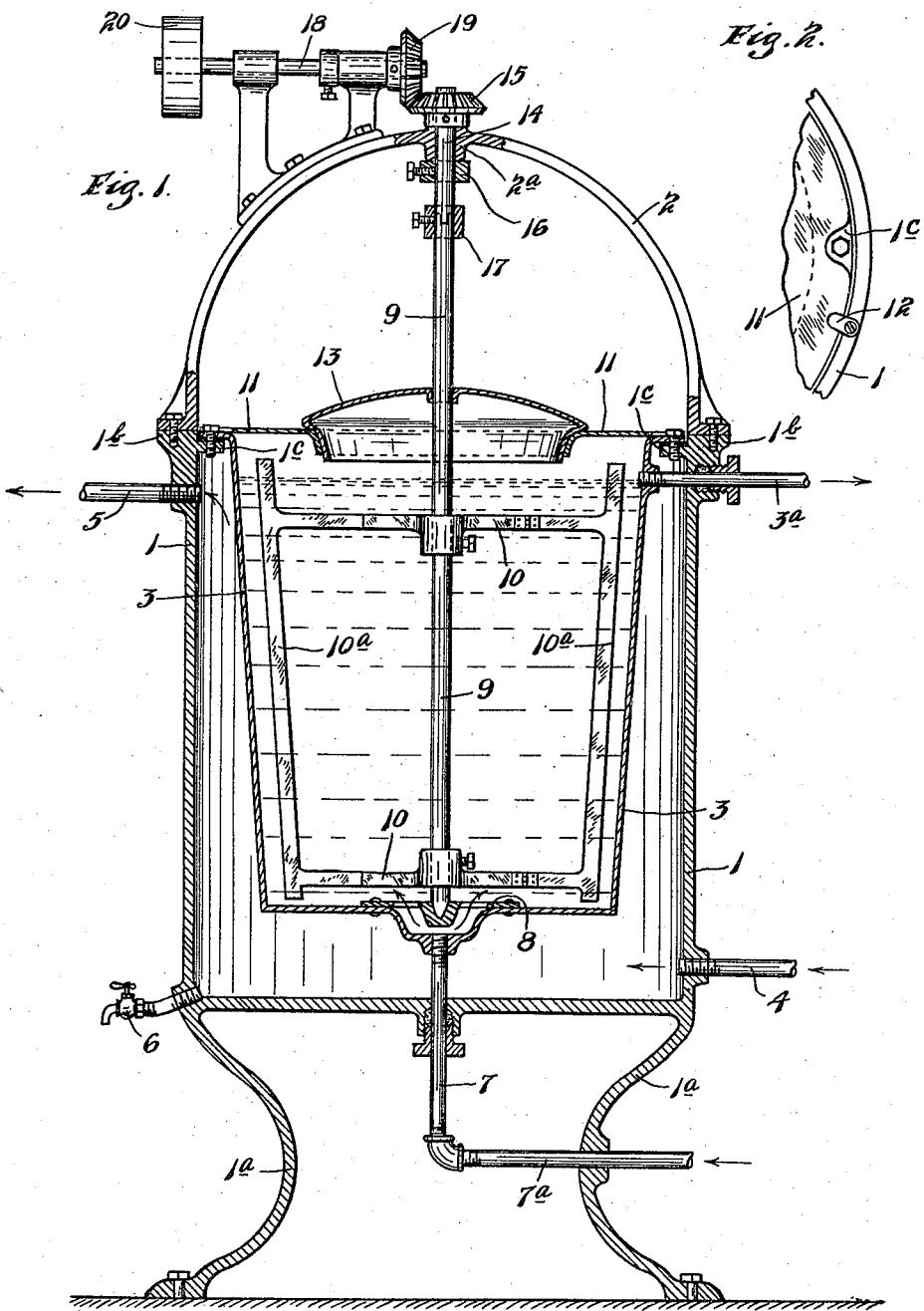
INVENTOR.
CARL J. WESTERGAARD.
BY HIS ATTORNEY.
James F. Williamson Patented Apr. 10, 1923.

1,451,132

UNITED STATES PATENT OFFICE.

CARL J. WESTERGAARD, OF MINNEAPOLIS, MINNESOTA.

MILK AND CREAM PASTEURIZER.

Application filed June 24, 1921. Serial No. 480,016.

*To all whom it may concern:*

Be it known that I, CARL J. WESTERGAARD, a subject of the King of Denmark, but has taken out first papers to become a citizen of the United States, residing at Minneapolis, in the county of Hennepin and State of Minnesota, have invented certain new and useful Improvements in Milk and Cream Pasteurizers; and I do hereby declare the following to be a full, clear, and exact description of the invention, such as will enable others skilled in the art to which it appertains to make and use the same.

This invention relates to a milk and cream pasteurizer or ripener, such as is now commonly used in creameries and milk handling establishments.

It is an object of this invention to provide a ripener of compact construction, of pleasing and sanitary design and one which is assembled so that the same can be easily and conveniently cleaned.

It is a further object of the invention to provide a ripener having a driving mechanism above the same and constructed so that it can be readily disconnected from the operating parts of the device when the latter is to be cleaned.

These and other objects and advantages of the invention will be fully set forth in the following description made in connection with the accompanying drawings in which like reference characters refer to the same parts throughout the different views, and in which—

Fig. 1 is a central vertical section of the device; and

Fig. 2 is a partial plan view of a portion thereof.

Referring to the drawings, the device comprises a vessel or casing 1 of general cylindrical shape and having formed therewith an integral base portion 1ª, the sides of which are curved to merge with the sides of the cylindrical portion. The casing 1 is provided at diametrically opposite portions on its top with lugs 1ᵇ, to which are bolted by suitable bolts, a frame 2 arranged to support the driving mechanism. A flange 1ᶜ projects inwardly of the casing 1 adjacent its top portion and forms a supporting ledge for a frusto-conical vessel 3 having an outwardly turned flange at its upper edge which rests upon and is bolted to the flange 1ᶜ, a suitable packing material being secured between the two parts. The space between the vessel 3 and the casing 1 is designed to be used as a steam chamber and a steam inlet pipe 4 and a steam outlet pipe 5 are shown as connected to this chamber, a drain cock 6 also being shown at the bottom thereof. The vessel 3 is provided with a central depression at the bottom thereof into which is threaded a pipe 7 which passes downwardly through the bottom of the casing 1, being packed in said bottom by a suitable stuffing box and gland. A pipe 7ª is connected by an elbow to the pipe 7 and passes laterally at right angles thereto through one side of the base 1ª and pipes 7 and 7ª form the inlet means for the milk or cream which is charged into the vessel 3. A spider step bearing 8 is secured about the depression in the vessel 3 and forms a support for a vertical shaft 9 to which is rigidly secured a stirring paddle member 10. The member 10 has spaced hubs secured to the shaft 9 by set screws and from which extend oppositely disposed arms to which are hinged at their outer ends paddles 10ª. The paddles 10ª are thus disposed at opposite sides of the shaft 9 but by means of the hinges can be collapsed toward said shaft. An outlet pipe or conduit 3ª extends into the vessel 3 closely adjacent the top thereof and passes laterally outward through the casing 1 in which it is suitably packed by the usual stuffing gland.

A cover 11 is provided for the vessel 3 and is detachably secured to the top thereof by any suitable means, such as the rotatable buttons secured at intervals about the top of the casing 1 and which are designed to be turned over the edge of the cover for engagement therewith. The cover is provided with recesses about its edge through which pass the bolts securing the vessel 3 in position. The cover 11 is provided with a comparatively large central aperture, and the edge of the cover about this aperture is curved to form a flange projecting into the vessel. A removable lid 13 having a downwardly curved circumferential flange is arranged to fit within the aperture in the cover 11 and said lid is provided with a central opening in its top through which passes a shaft 9.

A frame 2 extends upwardly above the casing 1 in substantially the form of a semicircle and is provided at its upper central portion with a hub 2$^a$ through which extends and is journaled a vertical rotatable shaft 14 having secured to its upper end a beveled gear 15. The shaft 14 is held against vertical movement by a collar 16 secured thereto by a set screw and the shafts 14 and 9 are detachably connected by any suitable form of shaft coupling 17. A horizontal shaft 18 is journaled in spaced bearings secured to the frame 2 and has a beveled gear 19 at its end meshing with the gear 15. The shaft 18 is also provided with a collar secured thereto to hold the same against longitudinal movement and carries a pulley or pulleys 20 by which it is driven by a belt attached to said pulley and connected to any convenient source of power.

The operation of the device is as follows:

The pipes 4 and 5 will be connected to a steam supply and steam turned into the steam chamber. The milk or cream will be discharged into the bottom of the vessel 3 and the stirrer 10 will be rotated through the shafts 9 and 18.

The material in the said vessel will thus be given a rotary motion, and owing to the entering material and the conical shape of the vessel 1, will gradually travel toward the top thereof and will be discharged through the outlet conduit 3$^a$. In practice, this conduit may be provided with a deflector for directing the fluid thereinto. The fluid, as stated, will be thrown outward around the outside walls of the vessel 3 and the inturned flange on the cover 11 will prevent this fluid from tending to pass out through the aperture therein. The lid 13 can thus be raised and the interior of the pasteurizer observed without any danger of the material being thrown out of the same.

When it is desired to clean the vessel 1, which must be frequently done, the shafts 9 and 14 will be disengaged by loosening the coupling 17. The shaft 9 can then be slightly raised and its upper end swung to one side, the cover 13 can be slid out of the opening between said shafts. The stirrer can then be folded up by means of the hinges and removed bodily with the shaft 9 through the opening in the cover 11. If desired, the cover 11 can also be readily removed and the vessel 3 can then be conveniently and easily cleaned.

By having the drive disposed at the top of the device, the driving belts can pass upwardly and be out of the way of the operator. The fact that the base 1$^a$ is formed with its periphery flush with and merging into the sides of the cylinder 1, enables the same to be easily kept clean and prevents the accumulation of dirt and stale milk and cream upon the same, as happens with devices having spaced supporting legs. The sanitary regulations in regard to creameries and milk handling establishments are very rigid and such a base as disclosed by applicant has special utility in such an establishment.

It will, of course, be understood that various changes may be made in the form, details and arrangement of the device without departing from the scope of applicant's invention, which, generally stated, consists in the matter shown and described and set forth in the appended claims.

What is claimed is:

1. A pasteurizing device having in combination a cylindrical casing, a frusto-conical vessel supported therein with the top substantially flush with the top of said casing and spaced from the sides thereof with its large end uppermost and forming with the casing a steam chamber, means for passing steam through said steam chamber, means for charging fluid into said vessel through the bottom thereof, a cover for said vessel secured to said casing, a rotatable stirrer in said vessel, a central shaft supporting said stirrer, an outlet means for said vessel adjacent said cover passing through said casing, and a removable lid fitting in and supported in said cover, the shaft and stirrer being removable through the lid opening.

2. A pasteurizing device having in combination of cylindrical casing, a frusto-conical vessel supported therein and spaced from the sides thereof with its larger end uppermost and forming with the casing a steam chamber, an inlet opening at the bottom of said vessel, a step bearing substantially flush with said bottom, a vertical shaft support for said bearing, a stirrer in said vessel secured to said shaft, a cover on said vessel having a central aperture therein, said cover having a downwardly curved flange surrounding said aperture, a removable lid on said cover support for said aperture, said lid having a central opening therein through which the said vertical shaft passes.

3. The structure set forth in claim 2, a frame secured to and extending above said casing, a vertical shaft rotatably mounted therein in alinement with said vertical shaft, means for driving the same and a coupling detachably connecting said vertical shaft above said lid whereby the first mentioned shaft and stirrer can be uncoupled and removed through the lid opening.

4. A pasteurizer comprising a substantially cylindrical casing, a vessel supported therein and spaced from the sides thereof, a cover for said vessel having a central aperture therein, a removable lid supported in said aperture, a detachable vertical shaft supported in a bearing in the bottom of said vessel, a stirrer having oppositely disposed paddles secured to said shaft, said paddles being collapsible whereby the same can be folded and removed through the aperture in said cover.

In testimony whereof I affix my signature.

CARL J. WESTERGAARD.